US010438263B2

(12) United States Patent
Qu (10) Patent No.: US 10,438,263 B2
(45) Date of Patent: Oct. 8, 2019

(54) METHOD AND SYSTEM FOR INFORMATION RECORDING (71) Applicant: Alibaba Group Holding Limited, George Town, Grand Cayman (KY)

(72) Inventor: Linya Qu, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 420 days.

(21) Appl. No.: 14/848,011

(22) Filed: Sep. 8, 2015

(65) Prior Publication Data
US 2016/0092850 A1 Mar. 31, 2016

(30) Foreign Application Priority Data
Sep. 29, 2014 (CN) .......................... 2014 1 0514431

(51) Int. Cl.
G06Q 30/00 (2012.01)
G06Q 30/06 (2012.01)
G06Q 20/32 (2012.01)
G06Q 20/20 (2012.01)

(52) U.S. Cl.
CPC ....... *G06Q 30/0623* (2013.01); *G06Q 20/209* (2013.01); *G06Q 20/3276* (2013.01); *G06Q 30/0601* (2013.01)

(58) Field of Classification Search
CPC .... G06Q 20/0453; G06Q 20/20; G06Q 30/00; G07G 5/00
USPC .............................................. 705/26.1, 27.1
See application file for complete search history.

(56) References Cited

U.S. PATENT DOCUMENTS

| 6,766,956 | B1 | 7/2004 | Boylan, III |
| 8,308,056 | B2 | 11/2012 | Millan Marco |
| 8,670,976 | B2 | 3/2014 | Al-Omari |
| 8,725,490 | B2 | 5/2014 | Athsani |
| 8,817,959 | B1 | 8/2014 | O'Hanlon |
| 2002/0026475 | A1 | 2/2002 | Marmor |
| 2004/0078282 | A1 | 4/2004 | Robinson |
| 2004/0210841 | A1 | 10/2004 | Takahashi |

(Continued)

FOREIGN PATENT DOCUMENTS

| EP | 2782060 | 9/2014 |
| GB | 2283850 | 5/1995 |

(Continued)

OTHER PUBLICATIONS

Anonymous, "EnvoyWorldWide Unveils Intelligent and Interactive Messaging Capabilities at DEMO 2001," Business Wire, Feb. 2001.*

(Continued)

*Primary Examiner* — Brandy A Zukanovich
(74) *Attorney, Agent, or Firm* — Shun Yao; Park, Vaughan, Fleming & Dowler LLP (57) ABSTRACT

Embodiments of the present application disclose a method and system for recording purchase data performed by a first terminal device and a second terminal device. During operation, the first terminal device receives a command to record purchase data. In response to receiving the command to record purchase data, the first terminal device scans a digital object identifier generated by the second terminal device. The digital object identifier includes purchase data acquired by the second terminal device. The first terminal device then extracts and records the purchase data from the digital object identifier.

21 Claims, 7 Drawing Sheets

(56) References Cited

U.S. PATENT DOCUMENTS

| | | |
|---|---|---|
| 2005/0138124 A1 | 6/2005 | Klassen |
| 2006/0065733 A1 | 3/2006 | Lee |
| 2010/0159965 A1 | 6/2010 | Pascal |
| 2010/0272193 A1 | 10/2010 | Khan |
| 2011/0270751 A1 | 11/2011 | Csinger |
| 2012/0118976 A1 | 5/2012 | Debski |
| 2012/0271725 A1 | 10/2012 | Cheng |
| 2013/0144674 A1 | 6/2013 | Kim |
| 2013/0282360 A1 | 10/2013 | Shimota |
| 2014/0006198 A1 | 1/2014 | Daly |
| 2014/0195218 A1 | 7/2014 | Takaoka |
| 2015/0269565 A1 | 9/2015 | Inotay |
| 2015/0358787 A1 | 12/2015 | Huang |

FOREIGN PATENT DOCUMENTS

| | | |
|---|---|---|
| KR | 20100053707 | 5/2010 |
| WO | 2008064909 | 6/2008 |
| WO | 2010135263 | 11/2010 |
| WO | 2014001937 | 1/2014 |

OTHER PUBLICATIONS

Gao et al., "A 2D Barcode-Based Mobile Payment System; 320-329, Jun. 2009", http://www.researchgate.net/profile/Jerry_Gao/publication/221281905_A_2D_Barcode_Based_Mobile_Payment_System/links/54fffc590cf2eaf210bcd49c.pdf, entire document.

Rouillard. "Contextual QR Codes", 50-55, Jul. 2008, http://www.lifl.fr/-rouillar/publi/2008_Rouillard_ICCGI.pdf, entire document.

Carzaniga et al., "Designing Distributed Applications With Mobile Code Paradigms", 22-32, May 1997, http://sei.pku.edu.cn/-yaoguo/PhDReading07/carzaniga-icse19.pdf, entire document.

Johnston et al., "Electronic Data Interchange Using Two Dimensional Bar Code", 83-91, Jan. 1998, http://www.computer.org/csdl/proceedings/hicss/1998/8242/04/82420083.pdf.

Ibrahim et al., "Steganography Algorithm to Hide Secret Message Inside an Image", 102-108, Dec. 2011, http://arxiv.org/pdf/1112.2809.

\* cited by examiner

METHOD AND SYSTEM FOR INFORMATION RECORDING

RELATED APPLICATION

Under 35 U.S.C. 119, this application claims the benefit and right of priority of Chinese Patent Application No. 201410514431.X, filed 29 Sep. 2014.

BACKGROUND

Field

The present application relates to the technical field of data processing, and, in particular, a method and system for recording information.

Related Art

With the emergence of portable terminal devices, more and more information is being recorded by the terminal devices. For example, a user may need to record purchase data for accounting purposes. Purchase data is information detailing a user's purchases or other related activity. A user may record and view purchase data on a terminal device.

Currently, when a user needs to record purchase data, the user must manually input purchase data into the terminal device character by character. Purchase data may include a large quantity of content. The content is generally composed of a variety of different characters, such as Chinese, English, and numeric characters, plus a variety of other symbols. Manually inputting data can therefore be complicated and error-prone, especially when there is a large quantity of data. Furthermore, manually inputting purchase data is slow and may require a long period of time to enter data into the system. During this time the system may utilize resources to respond to the manual input, increasing both system load and energy consumption.

In some scenarios purchasers may make payments for purchasing transactions through a payment collection system. The payment collection system may record user identity information and corresponding purchase data. The payment collection system may send the purchase data to a client (e.g., terminal device) through a server, which may avoid the need for manual input of the purchase data. However, the purchase data sent by the payment collection system is not comprehensive and only includes purchase data associated with payments that the user makes through the payment collection system. The payment collection system cannot send to the client purchase data associated with the user's payments made outside of the payment collection system. Furthermore, the payment collection system needs to send user identity information along with the purchase data. Unfortunately, the user's data is not secure since a malicious party may gain access to both the user identity information and purchase data.

The conventional approaches for recording purchase data requires complicated operation and burdens the system with extra load. Furthermore, these conventional approaches lack comprehensive recording of purchase data and lack measures for securing the user's personal information.

SUMMARY OF INVENTION

One embodiment of the present invention provides a first terminal device for recording purchase data. During operation, the first terminal device receives a command to record purchase data. In response to receiving the command to record purchase data, the first terminal device scans a digital object identifier generated by a second terminal device. The digital object identifier includes the purchase data acquired by the second terminal device. The first terminal device then extracts and records the purchase data from the digital object identifier.

In a variation of this embodiment, the digital object identifier further includes a purchase category set by the second terminal device for the purchase data. The first terminal device also extracts the purchase category from the digital object identifier and stores data associating the recoded purchase data with the purchase category. The first terminal device may present the purchase data according to the purchase category, in response to receiving a command to present purchase data.

In a variation of this embodiment, the first terminal device stores data associating the recorded purchase data with the purchase category, in response to receiving user input to set a purchase category. The first terminal device may also present the purchase data according to the purchase category, in response to receiving a command to present purchase data.

In a variation of this embodiment, the digital object identifier further includes a purchase time recorded by the second terminal device for the purchase data. The first terminal device may extract the purchase time from the digital object identifier and store data associating the recorded purchase data with the purchase time. The first terminal device may present the purchase data according to a purchase time sequence, in response to receiving the command to present purchase data.

In a variation of this embodiment, the first terminal device records a current time as the purchase time and stores data associating the purchase data with the purchase time. The first terminal device may present the purchase data according to a purchase time sequence, in response to receiving a command to present purchase data.

In a variation of this embodiment, the first terminal device calculates a total purchase amount within a recent purchasing cycle. The system may determine that the total purchase amount exceeds a predetermined threshold. In response to determining that the total purchase amount exceeds the predetermined threshold, the first terminal device generates a notification message to inform the user that the purchases have exceeded the predetermined threshold.

In a variation of this embodiment, the first terminal device determines a product indicated by the purchase data. The first terminal device then searches for product information associated with the product, and presents the product information including a description and price of the product and information regarding the party that issued the product information.

Another embodiment of the present invention provides a second terminal device for recording purchase data. During operation, the second terminal device acquires purchase data and generates a digital object identifier that includes the purchase data. The second terminal device then outputs the digital object identifier. This allows a first terminal device to scan the digital object identifier, and extract and record the purchase data from the digital object identifier.

In a variation of this embodiment, in response to acquiring purchase data, the second terminal device sets a purchase category for the purchase data. The digital object identifier further includes the purchase category, thereby allowing the first terminal device to extract the purchase category from the digital object identifier. The first terminal device also stores data associating the recorded purchase data with the purchase category, and presents the purchase data according to the purchase category.

In a variation of this embodiment, in response to acquiring purchase data, the second terminal device records a current time as a purchase time of the purchase data. The digital object identifier further includes the purchase time, thereby allowing the first terminal device to extract the purchase time from the digital object identifier. The first terminal device may also store data associating the recorded purchase data with the purchase time, and present the purchase data according to a purchase time sequence.

BRIEF DESCRIPTION OF THE DRAWINGS

The accompanying drawings herein, which are incorporated herein and constitute a part of the specification, illustrate several exemplary embodiments of the present application and together with the description, serve to illustrate the present application, construing no limitation to the present application. In the drawings.

DETAILED DESCRIPTION

In order that those skilled in the art may better understand the solutions of the present application, a clear and complete description of technical solutions in the embodiments of the present application will be given below, in combination with the accompanying drawings in the embodiments of the present application. The embodiments described below are merely a part, but not all, of the embodiments of the present application. All other embodiments, obtained by those of ordinary skill in the art without creative effort based on the embodiments of the present application, fall into the protection scope of the present application.

Embodiments of the present invention solve the problem of time and energy-consuming manual entry of purchase data by using a terminal device to encode purchase data and generate a digital object identifier that includes the encoded purchase data. Another terminal device can then scan the digital object identifier to extract the purchase data, which obviates the need for a user to manually input purchase data.

In one embodiment, a second terminal may acquire purchase data, then generate and output a digital object identifier that includes the purchase data. A user need only operate a first terminal to scan the digital object identifier generated by the second terminal to extract the purchase data from the digital object identifier. This allows the first terminal to record the purchase data without requiring the user to manually input the purchase data. This simplifies user operation and reduces the load and energy consumption of the system. Furthermore, the first terminal does not need to receive purchase data and user identity information from a payment collection system. This ensures more comprehensive recording of the purchase data, prevents malicious parties from accessing the user identity and purchase data, and ensures the security of personal information.

Figure 1A:
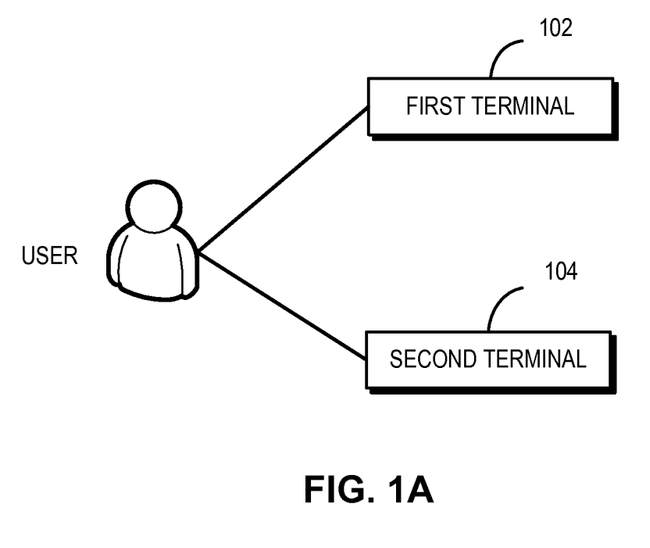
FIG. 1A illustrates a schematic diagram of a framework for recording purchase data in an exemplary application scenario, in accordance with an embodiment of the present application.

FIG. 1A illustrates a schematic diagram of a framework for recording purchase data in an exemplary application scenario, in accordance with an embodiment of the present application. As shown in FIG. 1A, a first terminal 102 may respond to receiving a command to record purchase data by scanning a digital object identifier generated by a second terminal 104. The digital object identifier includes the purchase data acquired by second terminal 104. Then, the first terminal 102 may extract and record the purchase data from the digital object identifier.

Figure 1B:
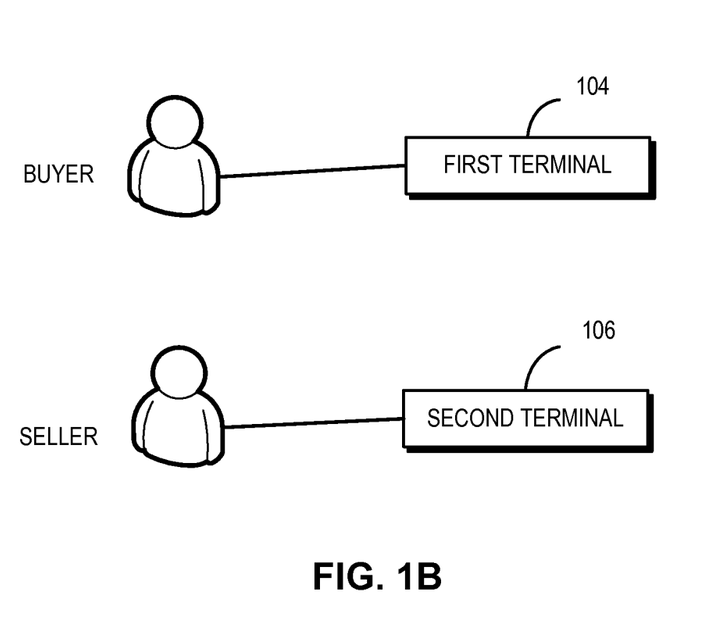
FIG. 1B illustrates a schematic diagram of a framework for recording purchase data in another exemplary application scenario, in accordance with an embodiment of the present application.

FIG. 1B illustrates a schematic diagram of a framework for recording purchase data in another exemplary application scenario, in accordance with an embodiment of the present application. As shown in FIG. 1B, a first terminal 104 may respond to receiving a command to record purchase data by scanning a digital object identifier generated by a second terminal 106. In the scenario depicted in FIG. 1B, a buyer operates first terminal 104, and a seller operates second terminal 106. The buyer and the seller are different users.

Note that the term "first terminal" indicates a user's terminal device that records purchase data by scanning a digital identifier. For example, the first terminal may be a mobile computing device such as a user's mobile phone or tablet computer. The term "second terminal" indicates a terminal device providing the purchase data by generating a digital object identifier. For example, the second terminal may be one of the terminal devices that a seller uses, such as a device for printing purchase data (e.g., a sales receipt printer), a personal computer that the seller uses to keep accounting records for the purchase data, or a tablet computer. Note that the user operating the first terminal and the user operating the second terminal may be the same user, or may be different users, and the implementations of the present application are not limited hereto.

Figure 2:
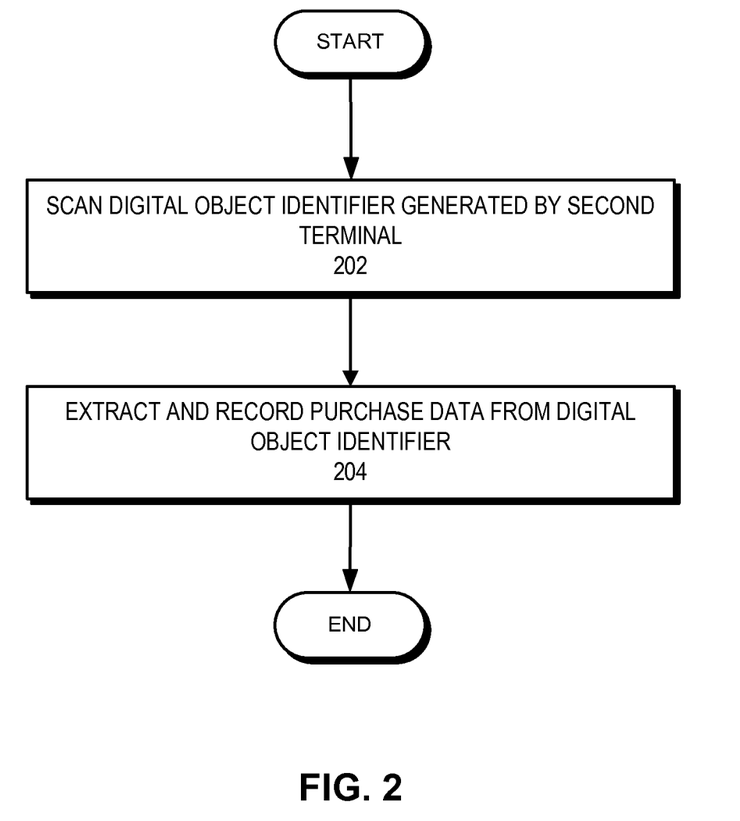
FIG. 2 illustrates an exemplary process executed by the first terminal for recording purchase data, in accordance with an embodiment of the present application.

FIG. 2 illustrates an exemplary process executed by the first terminal for recording purchase data, in accordance with an embodiment of the present application. During operation, the first terminal scans a digital object identifier generated by the second terminal, in response to receiving a command for recording purchase data (operation 202). The digital object identifier includes the purchase data acquired by the second terminal.

When a party completes a purchase transaction, the second terminal may acquire purchase data that includes details of the transaction. The second terminal may then generate the digital object identifier to include the purchase data. For example, the purchase data may include information about the transaction such as the businesses involved, total purchase amount, and details of involved products. The digital object identifier may be, for example, a two-dimensional barcode, a barcode, or other optical machine-readable representation of data. The second terminal may then output the digital object identifier. The user may operate the first terminal to cause the first terminal to generate a command for recording purchase data. The first terminal responds to the command and may start a scanning element to start scanning the digital object identifier.

The second terminal may output the digital object identifier using different mechanisms, and correspondingly, the first terminal may scan the digital object identifier using different methods. For example, the second terminal may output the digital object identifier by printing the generated digital object identifier on sale receipts, and the first terminal may scan the digital object identifier by scanning the sales receipts. As another example, the second terminal may display the generated digital object identifier on a screen, and the first terminal may scan the digital object identifier directly from the display of the second terminal.

The first terminal subsequently extracts and records the purchase data from the digital object identifier (operation 204). In an implementation, when scanning the digital object identifier, the first terminal may analyze the digital object identifier to extract the purchase data from the digital object identifier. The first terminal may locally record the purchase data in the first terminal. The user does not need to manually input the purchase data. Thus, the system does not need to allocate resources for a lengthy period of time to respond to the user's manual entry, thereby both simplifying user operation and reducing the load and energy consumption of the system. Furthermore, there is no need for a payment collection system to send purchase data and user identity information to the first terminal. This allows the first terminal to record the purchase data generated from payments made in various payment collection systems and prevents malicious parties from acquiring the user identity information and purchase data. This ensures the comprehensive recording of the purchase data and ensures the security of personal information of the user.

The purchase data recorded on the first terminal may be recorded with different classifications and/or with a certain sequential ordering. This allows the user to view the purchase data on the first terminal organized or ordered in different ways and facilitates searching, calculating, and analyzing of the purchase data.

In some implementations, the second terminal may provide one or more purchase categories that the user may select on the first terminal. In other implementations, the user may independently input custom categories. Some implementations can also offer the user the choice of either selecting a predetermined category or inputting a custom category.

In an implementation where the second terminal provides a predetermined category, the second terminal may set the purchase category for the purchase data and incorporate the purchase category and the purchase data into the digital object identifier. The first terminal may scan the digital object identifier and extract the purchase data and the purchase category from the digital object identifier. The first terminal may store data associating the recorded purchase data with the purchase category. The first terminal can record the purchase data with different classifications, and the first terminal may set the purchase category without manual operation by the user, thereby simplifying the user operation. The first terminal may then present the purchase data according to the categories.

The first terminal can also offer the user the choice of choosing from different categories provided by the second terminal. The categories may include the classification of products by usage, such as daily necessities, clothing, digital products, office supplies, and transportation. The categories may also include the classification of businesses indicated in the purchase data, such as supermarkets, e-commerce, and transportation. Since the seller typically has few categories, the seller may input the categories into the second terminal in advance, such as during initialization of the second terminal. The second terminal may thereby provide the predetermined categories that the user can select on the first terminal. The user may select from the available categories to set the purchase category for purchase data, and need not manually input the purchase category.

When a seller only has a single purchase category for the second terminal, the seller may input the single purchase category into the second terminal in advance. When the second terminal acquires the purchase data, the second terminal may set the single predetermined purchase category as the purchase category of the purchase data.

When the first terminal extracts the purchase data from the digital object identifier, the user may set the purchase category for the purchase data. The first terminal may receive user input indicating a purchase category for the purchase data through a category setting operation performed by the user, and record the purchase data to correspond to the purchase category. The user may manually input the name or unique identifier of the purchase category, and the first terminal may assign the purchase category according to the name or unique identifier provided by the user. Alternatively, the first terminal may present multiple predetermined categories to the user as disclosed above, and the user may manually select a purchase category. The first terminal can then store the user's selected purchase category. When the user sets the category, there is greater flexibility in setting the purchase category, and the purchase category is more applicable to the individual user since the user determines the category. Furthermore, there is consistency when dividing purchasing data obtained from multiple second terminals into different categories.

Some implementations may combine the methods disclosed above for recording purchase data with respective purchase categories. In such implementations, the first terminal may present the user with the choice of selecting a predetermined purchase category provided by the second terminal or entering a custom category. The second terminal generates and outputs the digital object identifier to include the purchase data and the predetermined purchase category. After scanning the digital object identifier and extracting the purchase data and the predetermined purchase category, the first terminal may present the predetermined purchase category to the user. The user then has the option to either select the predetermined purchase category for the purchase data, or independently input a different purchase category.

If the user chooses to independently set the purchase category, the user may input a custom purchase category on the first terminal. When receiving the user's input to set the custom purchase category, the first terminal may associate the recorded purchase data with the custom purchase category instead of associating the recorded purchase data with the predetermined purchase category. In this case, the user provides the purchase category for the purchase data by independently inputting the purchase category on the first terminal.

If the user does not need to independently set the purchase category, the user may directly associate the recorded purchase data with the predetermined purchase category. In this case, the second terminal provides the purchase category for the purchase data.

When the first terminal presents purchase data, the first terminal may allow the user to select a purchase category for presentation. After the user selects a purchase category, the first terminal may search for purchase data corresponding to the purchase category from stored purchase data and present the purchase data as search results to the user. In addition, the first terminal may present the purchase data to the user along with the corresponding purchase category.

In some embodiments, the first terminal may store and present purchase data on the first terminal with a purchase time sequence. The second terminal may record a purchase time for the purchase data and add the purchase category, purchase time, and purchase data into the digital object identifier. The second terminal records the purchase time so the recorded purchase time is closer to the actual time of the purchase, thereby providing a more accurate purchase time. The first terminal may scan the digital object identifier and respond to scanning of the digital object identifier by extracting the purchase data, purchase category, and the purchase time from the digital object identifier. The first terminal may then store data indicating the association between the purchase data and the purchase time. The first terminal may then respond to receiving a command to present purchase data by presenting the purchase data according to a purchase time sequence.

The first terminal may store purchase data with a purchase time sequence without receiving purchase time from the second terminal. The first terminal may scan a digital object identifier, extract the purchase data, and record the current time as the purchase time. The first terminal may store data associating the purchase data with the purchase time. In this way, the first terminal may record purchase data on the first terminal with a purchase time sequence, without needing to receive purchase time from the second terminal. The first terminal can thereby avoid recording purchase data without corresponding purchase time when the second terminal does not have the capability to record the purchase time.

In some implementations, the first terminal may respond to scanning of the digital object identifier by recording the current time as the purchase time and storing data associating the purchase data with the purchase time. The first terminal may respond to receiving a command to present purchase data by presenting the purchase data according to a purchase time sequence.

When the first terminal presents purchase data, the first terminal may present purchase data according to a positive time sequence (e.g., a positive sequential ordering) with earlier purchase times appearing in the front of the sequence. The first time terminal may also present purchase data according to a negative time sequence (e.g., a negative sequential ordering), in which purchase data with later purchase times appears at the front of the sequence.

Some implementations may combine the methods disclosed above for recording purchase data with a purchase time sequence. Some second terminals may have a purchase time recording function, while others may lack the functionality to record a purchase time. A second terminal that has a purchase time recording function may record the current time as a first purchase time of the purchase data when acquiring the purchase data. The second terminal generates and outputs the digital object identifier, which includes the purchase data and the first purchase time. For a second terminal with no purchase time recording function, the second terminal may generate the digital object identifier to include the purchase data but without a first purchase time.

When scanning the digital object identifier, if the first terminal can simultaneously extract the purchase data and the first purchase time, the first terminal may store data associating the recorded purchase data with the first purchase time. In this case, the second terminal provides the purchase time of the purchase data. If the first terminal can extract the purchase data but fails to extract the first purchase time, the first terminal may use a current time as a second purchase time of the purchase data. The first terminal may store data associating the recorded purchase data with the second purchase time. In this case, the first terminal is the terminal device that provides the purchase time of the purchase data.

The first terminal may allow the user to select one or more purchase time slots for search. After the user selects a purchase time slot, the first terminal searches the stored purchase data for purchase data within the user's selected time slot and presents purchase data from the search results to the user. The first terminal may present the purchase data with a corresponding purchase time.

Note that the first terminal and/or second terminal may determine a sequence for purchase data using other factors besides purchase time, such as total purchases. The first terminal may store purchase data with a sequence determined by total purchases.

Some implementations may record purchase data with combined classification and sequential ordering information. For example, the second terminal may set the purchase category for the purchase data and record the purchase time, and generate and output the digital object identifier. The digital object identifier includes the purchase data, the purchase time, and the purchase category. When scanning the digital object identifier, the first terminal may extract the purchase data, the purchase time and the purchase category. The first terminal may then store the purchase data with data associating the purchase data with the purchase time and the purchase category, to enable the user to view the purchase data according to a time sequence in a classified manner.

After the first terminal records purchase data, the first terminal may provide purchasing suggestions to the user, to facilitate more reasonable purchasing decisions on the part of the user. For example, the first terminal may compute a total purchase amount of the recorded purchase data and determine whether the purchases of the user have exceeded a predetermined threshold. The first terminal may then notify the user of the purchasing amount in excess of the threshold, thereby allowing the user to avoid excessive purchasing.

The first terminal may calculate the total purchase amount within a recent purchasing cycle based on the recorded purchase data. In response to determining that the total purchase amount exceeds a predetermined threshold, the first terminal generates a message to inform the user that the user has exceeded the predetermined threshold. Note that both the threshold for the total purchase amount and the duration of time for the purchasing cycle may be predetermined. Further, the first terminal need only calculate the sum of the amounts for all recorded purchase data accumulated within the recent purchasing cycle to serve as the total purchase amount. For example, assuming that the purchasing cycle is a calendar month, and the current date is September 11, then the total purchase amount is the sum of the amounts of all recorded purchase data from September 1 to September 11.

In some embodiments, the first terminal may determine the selling price of a product from different sellers that the user purchases often and present the selling prices to the user, so that the user may be informed in subsequent purchases. The first terminal may search for product information available from different sellers for a product indicated in purchase data. The product information may include the description and price of the target product, as well as information regarding the party that issued the product information. To inform the user which sellers provide lower selling prices, the first terminal may search for prices lower than the price of the product indicated by the purchase data. The price of the product may be found in the purchase data and/or other available information for the product. The first terminal can provide the product information, including the selling price from the different sellers, to the user to serve as reference when the user subsequently purchases the same product.

An exemplary method for recording purchase data in an embodiment of the present application is described above from the point of view of the first terminal. A method for recording purchase data in an exemplary implementation of the present application is described below from the point of view of the second terminal.

Figure 3:
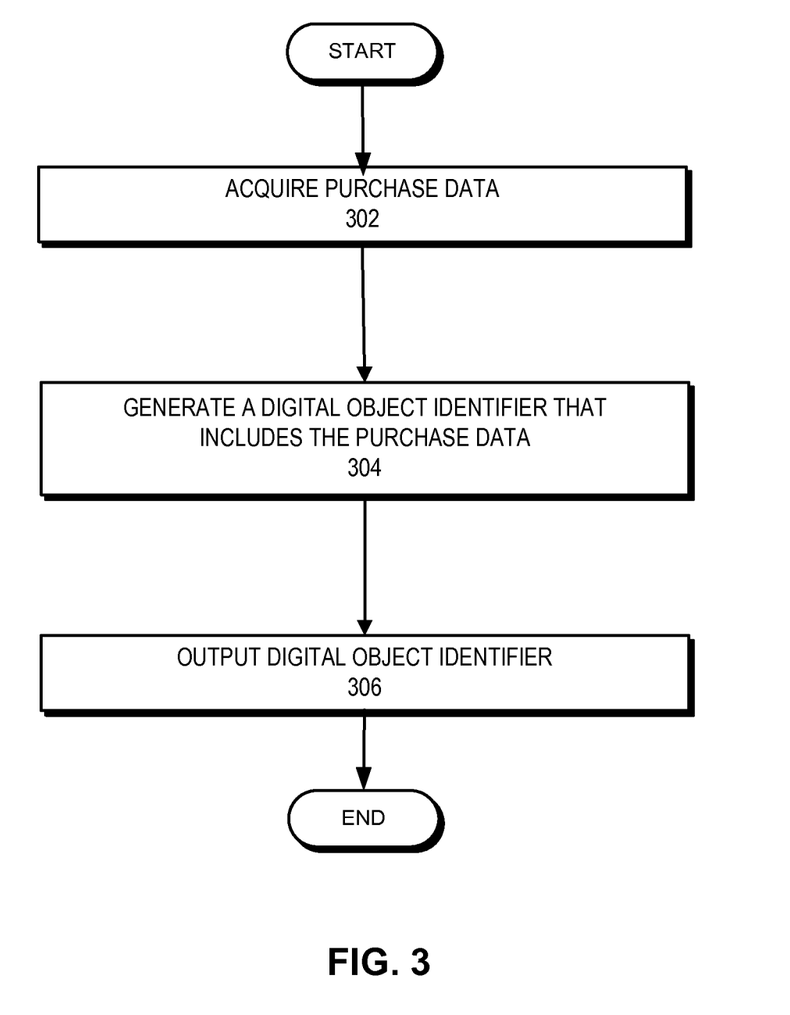
FIG. 3 illustrates an exemplary process executed by the second terminal for encoding purchase data in a digital object identifier, in accordance with an embodiment of the present application.

FIG. 3 illustrates an exemplary process executed by the second terminal for encoding purchase data in a digital object identifier, in accordance with an embodiment of the present application. During operation, the second terminal acquires purchase data (operation 302). The second terminal may acquire the purchase data from any source of purchase data. The second terminal then generates a digital object identifier that includes the purchase data (operation 304). The digital object identifier may also include a purchase category and a purchase time, as well as other related data. Subsequently, the second terminal outputs the digital object identifier (operation 306). This allows a first terminal to scan the digital object identifier generated by the second terminal and extract and record the purchase data from the digital object identifier.

The second terminal may respond to acquiring purchase data by setting a purchase category for the purchase data, so that the digital object identifier further includes the purchase category. This allows the first terminal to respond to scanning of the digital object identifier by extracting the purchase category from the digital object identifier and associating the recorded purchase data with the purchase category. The first terminal may then respond to receiving a command to present purchase data by presenting the purchase data according to the purchase category.

The second terminal may also respond to acquiring purchase data by recording the current time as the purchase time of the purchase data. The digital object identifier may further include the purchase time. This allows the first terminal to respond to scanning of the digital object identifier by extracting the purchase time from the digital object identifier and storing data associating the recorded purchase data with the purchase time. The first terminal may store the purchase data with a purchase time sequence. The first terminal may respond to receiving a command to present purchase data by presenting the purchase data according to the purchase time sequence.

Some implementations of the present application are disclosed below using an example scenario. In the example, the second terminal is a sales receipt printing device. The second terminal outputs the digital object identifier by printing a generated digital object identifier on a sales receipt. The digital object identifier generated by the second terminal includes the purchase data, purchase time, and purchase category. The first terminal records the purchase data with a purchase category and purchase time sequence information.

Figure 4:
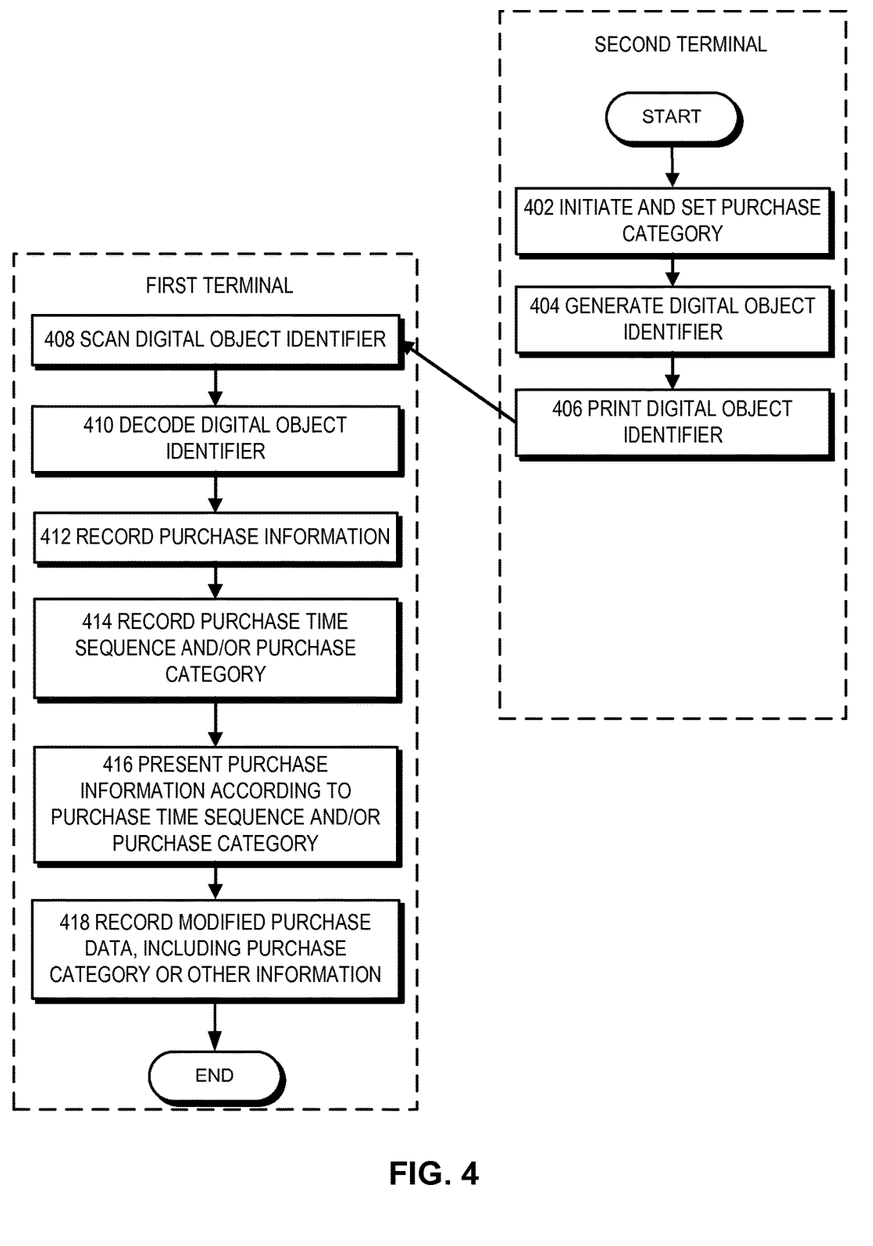
FIG. 4 illustrates an exemplary process for generating a digital object identifier and scanning the digital object identifier to extract purchase data, in accordance with an embodiment of the present application.

FIG. 4 illustrates an exemplary process for generating a digital object identifier and scanning the digital object identifier to extract purchase data, in accordance with an embodiment of the present application. During operation, the second terminal responds to user input to set the purchase category during program initialization by setting and storing a purchase category for purchase data (operation 402).

Next, the second terminal generates a digital object identifier (operation 404). The second terminal may generate the digital object identifier after acquiring all purchase data. The second terminal may form the digital object identifier using the stored purchase category as a first information fragment, the current time as a second information fragment, and the purchase data as a third information fragment. The second terminal merges and encodes the three information fragments to form the digital object identifier. The digital object identifier therefore includes three types of information, which are the purchase data, purchase category and purchase time. In some implementations, the second terminal may generate a digital object identifier that is a two-dimensional barcode. The second terminal may print the digital object identifier on a sales receipt and output the sales receipt (operation 406).

The first terminal may respond to receiving a command to record purchase information by scanning the digital object identifier printed on the sales receipt (operation 408). The first terminal may decode the digital object identifier, thereby acquiring the purchase data, the purchase category and the purchase time encoded in the digital object identifier (operation 410). The first terminal subsequently records the purchase information locally (operation 412).

The first terminal may store data associating the recorded purchase data with the purchase category and a purchase time sequence (operation 414). The first terminal also may store data associating the recorded purchase data with the position of a respective purchase time in a purchase time sequence.

The first terminal may present the purchase data according to the purchase category associated with the purchase data and the position of the respective purchase time in the purchase time sequence (operation 416). In some implementations, there may be multiple purchase categories associated with different purchase data, and the first terminal may store and present the purchase data according to the multiple purchase categories.

The user may modify the purchase data on the first terminal. The first terminal may respond to the user input to modify the purchase data and record the modified purchase data (operation 418). For example, the user may modify the product name, the seller name, and/or purchase category and the first terminal may store these changes. The user may then view the purchase data organized according to time sequence and/or purchase category, thereby allowing the user to manage the purchase data with greater flexibility and efficiency.

Figure 5:
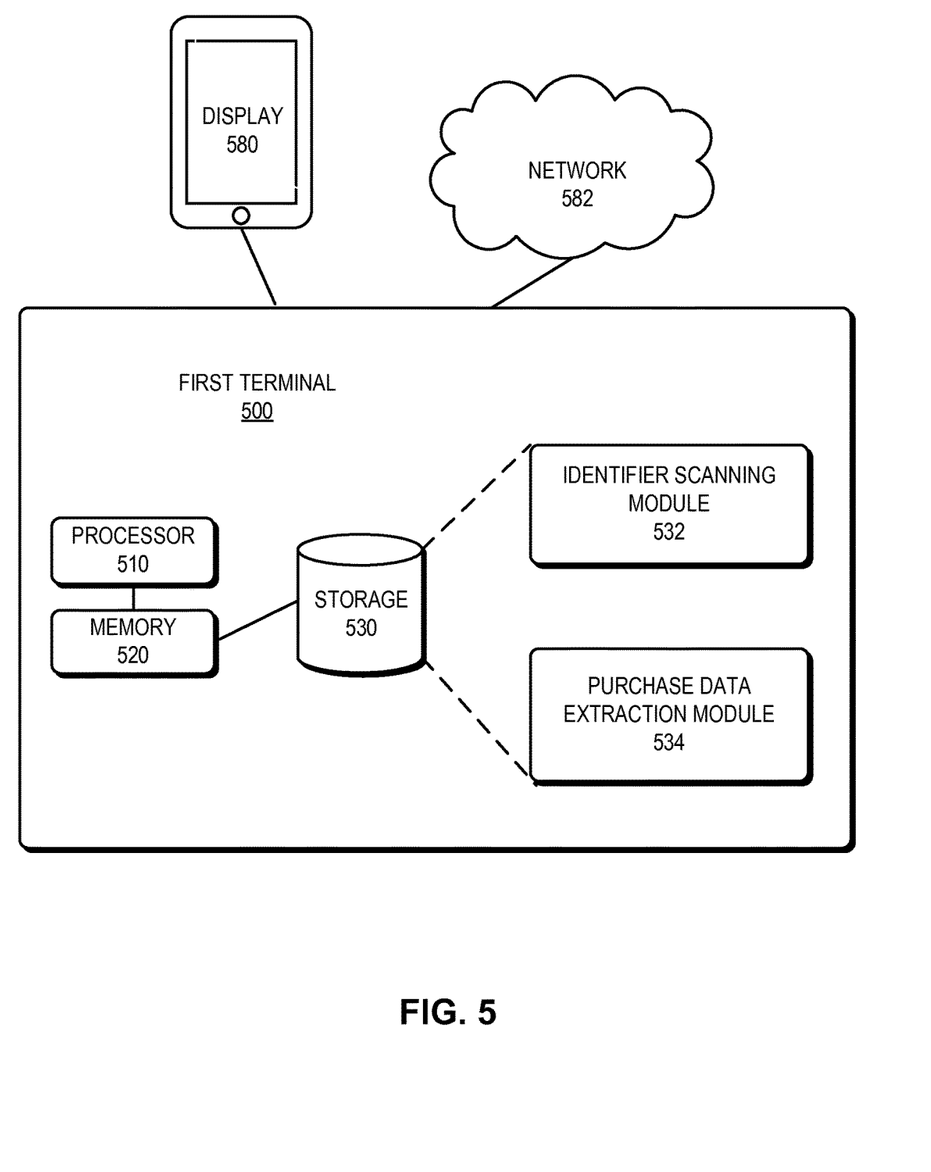
FIG. 5 illustrates an exemplary first terminal device for recording purchase data, in accordance with an embodiment of the present invention.

FIG. 5 illustrates an exemplary first terminal device for recording purchase data, in accordance with an embodiment of the present invention. A first terminal 500 includes a processor 510, a memory 520, and a storage device 530. Storage 530 typically stores instructions that can be loaded into memory 520 and executed by processor 510 to perform the methods described above. In one embodiment, the instructions in storage 530 can implement an identifier scanning module 532 and a purchase data extraction module 534, which can communicate with each other through various means.

In some embodiments, modules 532 and 534 can be partially or entirely implemented in hardware and can be part of processor 510. Further, in some embodiments, first terminal 500 may not include a separate processor and memory. Instead, in addition to performing their specific tasks, modules 532 and 534, either separately or in concert, may be part of special-purpose computation engines.

Storage 530 stores programs to be executed by processor 510. Specifically, storage 530 stores a program that implements a system (e.g., application) for recording purchase data. During operation, the application program can be loaded from storage 530 into memory 520 and executed by processor 510. As a result, first terminal 500 can perform the functions described above. First terminal 500 further includes a display 580, and optionally can be coupled to a keyboard and a pointing device, and can be coupled via one or more network interfaces to a network 582.

Identifier scanning module 532 records purchase data by scanning a digital object identifier that includes purchase data acquired by the second terminal. Purchase data extraction module 534 extracts and records the purchase data from the digital object identifier. In some implementations, the digital object identifier may include the purchase category set by the second terminal for the purchase data.

First terminal device 500 may further include a purchase category extraction module and a first presentation module. The purchase category extraction module extracts the purchase category from the digital object identifier and associates the recoded purchase data with the purchase category. The first presentation module may respond to receiving a command to present purchase data by presenting the purchase data according to the purchase category.

First terminal device 500 may further include a purchase category acquisition module and a first presentation module. The purchase category acquisition module is configured to respond to receiving user input to set the purchase category by storing data associating the recorded purchase data with the purchase category. The first presentation module is configured to respond to receiving a command to present purchase data by presenting the purchase data according to the purchase category.

First terminal device 500 may further include a purchase time extraction module and a second presentation module. A digital object identifier may include a purchase time set by the second terminal for the purchase data. The purchase time extraction module is configured to respond to scanning of the digital object identifier by extracting the purchase time from the digital object identifier and storing data associating the recorded purchase data with the purchase time. The second presentation module may also be configured to respond to receiving a command to present purchase data by presenting the purchase data according to a purchase time sequence.

First terminal device 500 may further include a purchase time recording module and a second presentation module. The purchase time recording module is configured to respond to scanning of the digital object identifier by recording the current time as the purchase time and store data associating the purchase data with the purchase time. The second presentation module may be configured to respond to receiving a command to present purchase data by presenting the purchase data according to a purchase time sequence.

First terminal device 500 may further include a total purchase amount calculating module, a threshold comparison module, and a notification message generating module. The total purchase amount calculating module is configured to calculate a total purchase amount within a recent purchasing cycle, based on the recorded purchase data. The threshold comparison module is configured to determine whether the total purchase amount exceeds a predetermined threshold. The notification message generating module is configured to respond to determining that the total purchase amount exceeds a predetermined threshold by generating a notification message. The notification message informs the user that the total purchase amount has exceeded the predetermined threshold.

First terminal device 500 may further include a product information search module. The product information search module is configured to search for and present information available for a product indicated in purchase data. The product information may include the description and price of the product, as well as information regarding the party that issued the product information.

Figure 6:
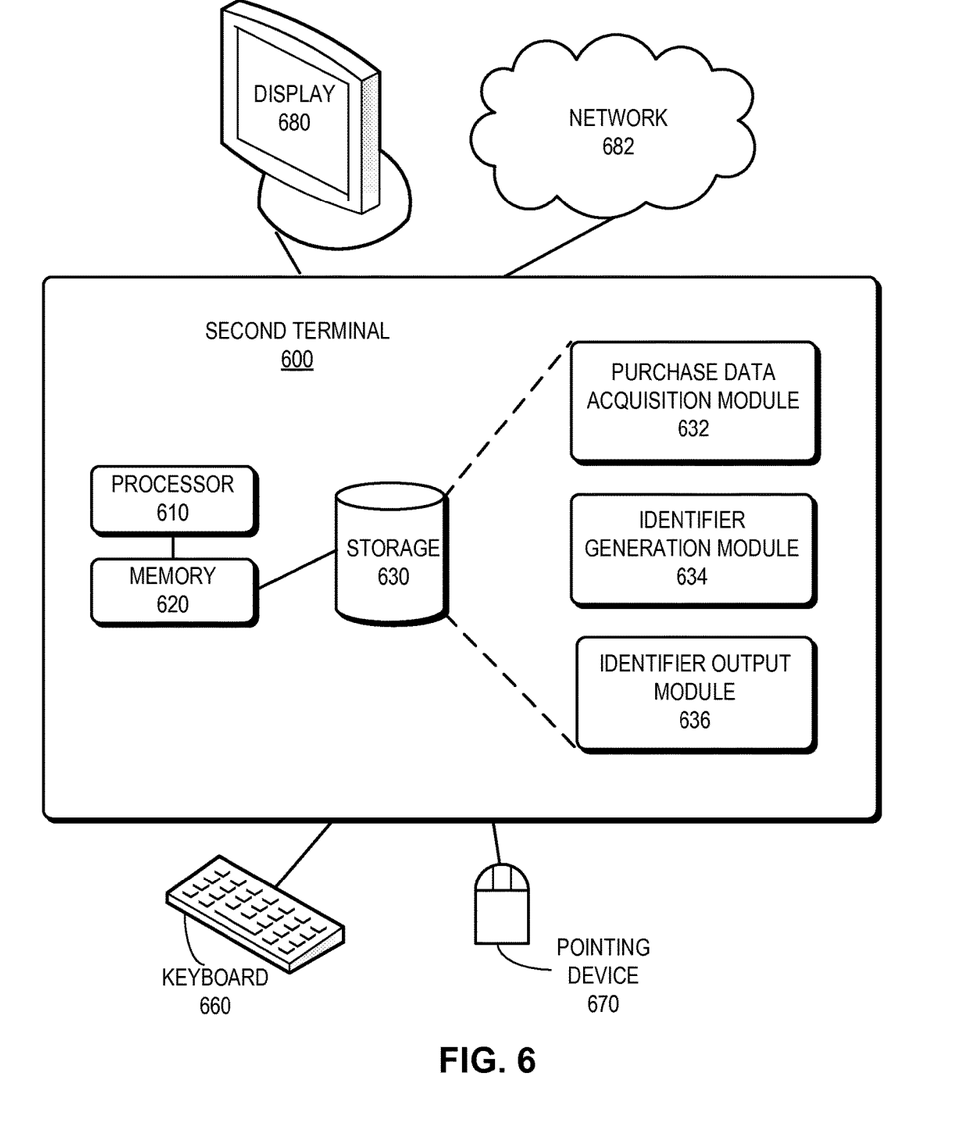
FIG. 6 illustrates an exemplary second terminal device for recording purchase data, in accordance with an embodiment of the present invention.

FIG. 6 illustrates an exemplary second terminal device for recording purchase data, in accordance with an embodiment of the present invention. A second terminal 600 includes a processor 610, a memory 620, and a storage device 630. Storage 630 typically stores instructions that can be loaded into memory 620 and executed by processor 610 to perform the methods described above. In one embodiment, the instructions in storage 630 can implement a purchase data acquisition module 632, an identifier generation module 634, and an identifier output module 636, which can communicate with each other through various means.

In some embodiments, modules 632, 634 and 636 can be partially or entirely implemented in hardware and can be part of processor 610. Further, in some embodiments, the second terminal device may not include a separate processor and memory. Instead, in addition to performing their specific tasks, modules 632, 634 and 636, either separately or in concert, may be part of special-purpose computation engines.

Storage 630 stores programs to be executed by processor 610. Specifically, storage 630 stores a program that implements a system (e.g., application) for recording purchase data. During operation, the application program can be loaded from storage 630 into memory 620 and executed by processor 610. As a result, second terminal 600 can perform the functions described above. Second terminal 600 further optionally includes a display 680, and can be coupled to a keyboard 660 and a pointing device 670, and can be coupled via one or more network interfaces to a network 682.

Purchase data acquisition module 632 is configured to acquire purchase data. Identifier generation module 634 is configured to generate a digital object identifier that includes the purchase data. Identifier output module 636 is configured to output the digital object identifier. These components of second terminal 600 operate together to generate and output the digital object identifier, thereby allowing a first terminal to scan the digital object identifier and extract and record the purchase data.

The second terminal device may further include a purchase category setting module. The purchase category setting module is configured to respond to acquiring purchase data by setting a purchase category for the purchase data. The digital object identifier further includes the purchase category. This allows the first terminal to respond to scanning of the digital object identifier by extracting the purchase category and associating the recorded purchase data with the purchase category. The first terminal may then respond to receiving a command to present purchase data by presenting the purchase data according to the purchase category.

The second terminal device may further include a purchase time recording module. The purchase time recording module is configured to respond to acquiring purchase data by recording the current time as the purchase time of the purchase data. The digital object identifier may further include the purchase time. This allows the first terminal to respond to scanning the digital object identifier by extracting the purchase time from the digital object identifier. The first terminal may then associate the recorded purchase data with the purchase time. The first terminal may respond to receiving a command to present purchase data by presenting the purchase data according to a purchase time sequence.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for recording purchase data performed by a first terminal device, comprising:
   receiving, by the first terminal device, a first command to record purchase data;
   in response to receiving the first command, scanning, by a user of the first terminal device, a digital object identifier which comprises encoded purchase data and which is generated by a second terminal device, wherein the purchase data is acquired and encoded by the second terminal device;
   obtaining the purchase data from a scanned image of the digital object identifier by decoding the encoded purchase data without requiring the user to manually input the purchase data;
   reducing an energy and load consumption of the first terminal device;
   determining whether a purchase time can be obtained from the scanned image of the digital object identifier;
   in response to determining that the purchase time cannot be obtained from the scanned image of the digital object identifier, assigning, by the first terminal device, a current time as the purchase time of the purchase data;
   in response to determining that the purchase time can be obtained from the scanned image of the digital object identifier, assigning, by the first terminal device, a second purchase time as the purchase time of the purchase time of the purchase data, wherein the second purchase time is extracted from the scanned image of the digital object identifier;
   storing the purchase data and data associating the purchase data with the purchase time; and
   providing a purchase suggestion to the user of the first terminal device, which involves, in response to determining that a total purchase amount within a predetermined recent purchasing cycle exceeds a predetermined threshold:
      generating a notification message to inform the user that purchases corresponding to the total purchase amount have exceeded the predetermined threshold, wherein the notification message is presented to the user on a display screen of the first terminal device; and
      refraining, by the user, from making a purchase when the total purchase amount within the predetermined recent purchasing cycle exceeds the predetermined threshold.

2. The method according to claim 1, wherein the digital object identifier further comprises a purchase category set by the second terminal device for the purchase data, and the method further comprises:
   extracting the purchase category from the digital object identifier;
   storing data associating the stored purchase data with the purchase category; and
   in response to receiving a second command to present purchase data, presenting the purchase data according to the purchase category.

3. The method according to claim 1, further comprising:
   in response to receiving user input to set a purchase category, storing data associating the stored purchase data with the purchase category; and in response to receiving a second command to present purchase data, presenting the purchase data according to the purchase category.

4. The method according to claim 1, wherein in response to determining that the purchase time can be obtained from the scanned image of the digital object identifier, the method further comprises:
determining that the scanned image of the digital object identifier indicates the second purchase time for the purchase data, wherein the second purchase time is recorded by the second terminal device;
extracting the second purchase time from the scanned image of the digital object identifier; and
in response to receiving a second command to present purchase data, presenting the purchase data according to a purchase time sequence which includes the second purchase time.

5. The method according to claim 1, further comprising:
in response to receiving a second command to present purchase data, presenting the purchase data according to a purchase time sequence which includes the stored purchase time.

6. The method according to claim 1, further comprising:
calculating the total purchase amount within the predetermined recent purchasing cycle.

7. The method according to claim 1, further comprising:
determining a product indicated by the purchase data;
searching for product information associated with the product; and
presenting the product information including a description and a price of the product and information regarding a party that issued the product information.

8. A method for recording purchase data performed by a second terminal device, comprising:
acquiring, by the second terminal device, purchase data;
encoding, by the second terminal device, the purchase data;
generating, by the second terminal device, a digital object identifier which comprises the encoded purchase data; and
transmitting, by the second terminal device, the digital object identifier to a first terminal device, which causes the first terminal device to:
scan, by a user of the first terminal device, the digital object identifier;
obtain the purchase data from a scanned image of the digital object identifier by decoding the encoded purchase data without requiring the user to manually input the purchase data;
reduce an energy and load consumption of the first terminal device;
determine whether a purchase time can be obtained from the scanned image of the digital object identifier;
in response to determining that the purchase time cannot be obtained from the scanned image of the digital object identifier, assign, by the first terminal device, a current time as the purchase time of the purchase data;
in response to determining that the purchase time can be obtained from the scanned image of the digital object identifier, assign, by the first terminal device, a second purchase time as the purchase time of the purchase data, wherein the second purchase time is extracted from the scanned image of the digital object identifier;
store the purchase data and data associating the purchase data with the purchase time; and
provide a purchase suggestion to the user of the first terminal device, which involves, in response to determining that a total purchase amount within a predetermined recent purchasing cycle exceeds a predetermined threshold:
generating a notification message to inform the user that purchases corresponding to the total purchase amount have exceeded the predetermined threshold, wherein the notification message is presented to the user on a display screen of the first terminal device; and
refraining, by the user, from making a purchase when the total purchase amount within the predetermined recent purchasing cycle exceeds the predetermined threshold.

9. The method according to claim 8, further comprising:
in response to acquiring the purchase data, setting a purchase category for the purchase data, wherein the digital object identifier further comprises the purchase category, thereby allowing the first terminal device to extract the purchase category from the digital object identifier, to store data associating the stored purchase data with the purchase category, and to present the purchase data according to the purchase category.

10. The method according to claim 8, further comprising:
in response to acquiring the purchase data, storing, by the second terminal device, a current time as the purchase time of the purchase data; and
including, by the second terminal device, the purchase time in the digital object identifier;
wherein transmitting, by the second terminal device, the digital object identifier to the first terminal device further causes the first terminal device, in response to determining that a purchase time can be obtained from the scanned image of the digital object identifier, to:
extract, by the first terminal device, the purchase time from the digital object identifier;
store the purchase data and data associating the stored purchase data with the purchase time; and
present, by the first terminal device, the purchase data according to a purchase time sequence which includes the stored purchase time.

11. A computer system for recording purchase data configured as a first terminal device, comprising:
a processor; and
a storage device storing instructions that when executed by the processor cause the processor to perform a method, the method comprising:
receiving, by the first terminal device, a first command to record purchase data;
in response to receiving the first command, scanning, by a user of the first terminal device, a digital object identifier which comprises encoded purchase data and which is generated by a second terminal device, wherein the purchase data is acquired and encoded by the second terminal device;
obtaining the purchase data from a scanned image of the digital object identifier by decoding the encoded purchase data without requiring the user to manually input the purchase data;
reducing an energy and load consumption of the first terminal device;
determining whether a purchase time can be obtained from the scanned image of the digital object identifier;

in response to determining that the purchase time cannot be obtained from the scanned image of the digital object identifier, assigning, by the first terminal device, a current time as the purchase time of the purchase data;

in response to determining that the purchase time can be obtained from the scanned image of the digital object identifier, assigning, by the first terminal device, a second purchase time as the purchase time of the purchase time of the purchase data, wherein the second purchase time is extracted from the scanned image of the digital object identifier;

storing the purchase data and data associating the purchase data with the purchase time; and providing a purchase suggestion to the user of the first terminal device, which involves, in response to determining that a total purchase amount within a predetermined recent purchasing cycle exceeds a predetermined threshold:

generating a notification message to inform the user that purchases corresponding to the total purchase amount have exceeded the predetermined threshold, wherein the notification message is presented to the user on a display screen of the first terminal device; and refraining, by the user, from making a purchase when the total purchase amount within the predetermined recent purchasing cycle exceeds the predetermined threshold.

12. The computer system according to claim 11, wherein the digital object identifier further comprises a purchase category set by the second terminal device for the purchase data, and wherein the method further comprises:

extracting the purchase category from the digital object identifier;

storing data associating the stored purchase data with the purchase category; and in response to receiving a second command to present purchase data, presenting the purchase data according to the purchase category.

13. The computer system according to claim 11, wherein the method further comprises:

in response to receiving user input to set the purchase category, storing data associating the stored purchase data with the purchase category; and in response to receiving a second command to present purchase data, presenting the purchase data according to the purchase category.

14. The computer system according to claim 11, wherein in response to determining that the purchase time can be obtained from the scanned image of the digital object identifier, the method further comprises:

determining that the scanned image of the digital object identifier indicates the second purchase time for the purchase data, wherein the second purchase time is recorded by the second terminal device;

extracting the second purchase time from the scanned image of the digital object identifier; and and in response to receiving a second command to present purchase data, presenting the purchase data according to a purchase time sequence which includes the second purchase time.

15. The computer system according to claim 11, wherein the method further comprises:

in response to receiving a second command to present purchase data, presenting the purchase data according to a purchase time sequence which includes the stored purchase time.

16. The computer system according to claim 11, wherein the method further comprises:

calculating the total purchase amount within the predetermined recent purchasing cycle.

17. The computer system according to claim 11, wherein the method further comprises:

determining a target product indicated by the purchase data;

searching for product information issued for the target product, wherein the product information comprises a description and a price of the target product, and information regarding a party that issued the product information.

18. A computer system for recording purchase data configured as a second terminal device, comprising:

a processor; and a storage device storing instructions that when executed by the processor cause the processor to perform a method, the method comprising:

acquiring, by the second terminal device, purchase data;

encoding, by the second terminal device, the purchase data;

generating, by the second terminal device, a digital object identifier which comprises the encoded purchase data; and transmitting, by the second terminal device, the digital object identifier to a first terminal device, which causes the first terminal device to:

scan, by a user of the first terminal device, the digital object identifier;

obtain the purchase data from a scanned image of the digital object identifier by decoding the encoded purchase data without requiring the user to manually input the purchase data;

reduce an energy and load consumption of the first terminal device;

determine whether a purchase time can be obtained from the scanned image of the digital object identifier;

in response to determining that a purchase time cannot be obtained from the scanned image of the digital object identifier, assign, by the first terminal device, a current time as a purchase time of the purchase data;

in response to determining that the purchase time can be obtained from the scanned image of the digital object identifier, assign, by the first terminal device, a second purchase time as the purchase time of the purchase time of the purchase data, wherein the second purchase time is extracted from the scanned image of the digital object identifier;

store the purchase data and data associating the purchase data with the purchase time; and provide a purchase suggestion to the user of the first terminal device, which involves, in response to determining that a total purchase amount within a predetermined recent purchasing cycle exceeds a predetermined threshold:

generating a notification message to inform the user that purchases corresponding to the total purchase amount have exceeded the predetermined threshold, wherein the notification message is presented to the user on a display screen of the first terminal device; and refraining, by the user, from making a purchase when the exceeds total purchase amount within the predetermined recent purchasing cycle exceeds the predetermined threshold.

19. The computer system according to claim 18, wherein the method further comprises:

in response to acquiring the purchase data, setting a purchase category for the purchase data, wherein the digital object identifier further comprises the purchase category, thereby allowing the first terminal device to extract the purchase category from the digital object identifier, to store data associating the stored purchase data with the purchase category, and to present the purchase data according to the purchase category.

20. The computer system according to claim 18, further comprising:

in response to acquiring the purchase data, storing, by the second terminal device, a current time as the purchase time of the purchase data; and including, by the second terminal device, the purchase time in the digital object identifier;

wherein transmitting, by the second terminal device, the digital object identifier to the first terminal device further causes the first terminal device, in response to determining that a purchase time can be obtained from the scanned image of the digital object identifier, to:

extract, by the first terminal device, the purchase time from the digital object identifier;

store the purchase data and data associating the stored purchase data with the purchase time; and present, by the first terminal device, the purchase data according to a purchase time sequence which includes the stored purchase time.

21. A non-transitory computer-readable storage medium storing instructions that when executed by a computer cause the computer to perform a method for recording purchase data, wherein the computer is configured as a first terminal device, the method comprising:

receiving, by the first terminal device, a command to record purchase data;

in response to receiving the command, scanning, by a user of the first terminal device, a digital object identifier which comprises encoded purchase data and which is generated by a second terminal device, wherein the purchase data is acquired and encoded by the second terminal device;

obtaining the purchase data from a scanned image of the digital object identifier by decoding the encoded purchase data without requiring the user to manually input the purchase data;

reducing an energy and load consumption of the first terminal device;

determining whether a purchase time can be obtained from the scanned image of the digital object identifier;

in response to determining that the purchase time cannot be obtained from the scanned image of the digital object identifier, assigning, by the first terminal device, a current time as the purchase time of the purchase data;

in response to determining that the purchase time can be obtained from the scanned image of the digital object identifier, assigning, by the first terminal device, a second purchase time as the purchase time of the purchase time of the purchase data, wherein the second purchase time is extracted from the scanned image of the digital object identifier;

storing the purchase data and data associating the purchase data with the purchase time; and providing a purchase suggestion to the user of the first terminal device, which involves, in response to determining that a total purchase amount within a predetermined recent purchasing cycle exceeds a predetermined threshold:

generating a notification message to inform the user that purchases corresponding to the total purchase amount have exceeded the predetermined threshold, wherein the notification message is presented to the user on a display screen of the first terminal device; and refraining, by the user, from making a purchase when the total purchase amount within the predetermined recent purchasing cycle exceeds the predetermined threshold.

* * * * *